(12) United States Patent
Huang et al.

(10) Patent No.: US 9,413,543 B2
(45) Date of Patent: Aug. 9, 2016

(54) METHOD, DEVICE AND SYSTEM FOR TRANSMITTING MULTIMEDIA BROADCAST MULTICAST SERVICE

(71) Applicant: Huawei Technologies Co., Ltd., Shenzhen (CN)

(72) Inventors: Qufang Huang, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 207 days.

(21) Appl. No.: 14/222,458

(22) Filed: Mar. 21, 2014

(65) Prior Publication Data
US 2014/0211682 A1    Jul. 31, 2014

Related U.S. Application Data

(63) Continuation of application No. PCT/CN2012/081715, filed on Sep. 21, 2012.

(30) Foreign Application Priority Data

Sep. 21, 2011  (CN) .......................... 2011 1 0282031

(51) Int. Cl.
*H04L 12/18* (2006.01)
*H04W 4/06* (2009.01)
*H04W 56/00* (2009.01)

(52) U.S. Cl.
CPC .............. *H04L 12/189* (2013.01); *H04W 4/06* (2013.01); *H04W 56/001* (2013.01)

(58) Field of Classification Search
None
See application file for complete search history.

(56) References Cited

U.S. PATENT DOCUMENTS

| 2003/0119452 A1* | 6/2003 | Kim | .................... H04W 52/143 455/69 |
| 2003/0231612 A1* | 12/2003 | Kim | ...................... H04W 36/12 370/342 |
| 2009/0245155 A1* | 10/2009 | Fukunaga | ........... H04W 72/005 370/312 |

FOREIGN PATENT DOCUMENTS

| CN | 1968451 A | 5/2007 |
| CN | 101175317 A | 5/2008 |
| CN | 101547401 A | 9/2009 |

OTHER PUBLICATIONS

3GPP TSG-RAN WG2 Meeting #72, R2-106880, Nov. 15-19, 2010. Huawei. Stage 2 agreements on MBMS enhancement. 3 pages.
International Search Report received in PCT/CN2012/081715, mailed Dec. 27, 2012, 10 pages.

* cited by examiner

*Primary Examiner* — Huy D Vu
*Assistant Examiner* — Bao G Nguyen
(74) *Attorney, Agent, or Firm* — Slater Matsil, LLP (57) ABSTRACT

A method, device and system are used for transmitting a Multimedia Broadcast Multicast Service (MBMS). The method includes sending, by a first base station, a service identifier of a MBMS that needs to be received by a user equipment in a coverage area of the first base station to a gateway. The first base station receives a data packet of the MBMS and a synchronization control packet on a first multicast channel which are sent by the gateway. The first multicast channel is a multicast channel where the MBMS is located.

16 Claims, 7 Drawing Sheets

METHOD, DEVICE AND SYSTEM FOR TRANSMITTING MULTIMEDIA BROADCAST MULTICAST SERVICE

This application is a continuation of International Application No. PCT/CN2012/081715, filed on Sep. 21, 2012, which claims priority to Chinese Patent Application No. 201110282031.7, filed on Sep. 21, 2011, both of which are hereby incorporated by reference in their entireties.

TECHNICAL FIELD

The present invention relates to the field of communications, and in particular to a method, device and system for transmitting a multimedia broadcast multicast service.

BACKGROUND

A Home evolved NodeB (HeNB) is a small base station, which is mainly used at home and in small public places. Because a coverage area is small, lower power is used to send information. The HeNB may also participate in Multimedia Broadcast multicast service Single Frequency Network (MBSFN) transmission of an outdoor evolved NodeB (eNB), so as to transmit a Multimedia Broadcast Multicast Service (MBMS) in the HeNB.

In an MBSFN transmitting manner, a plurality of cells is pre-configured to form an MBSFN combination area, and a plurality of eNBs in the combination area uses the same radio resource to transmit the MBMS, that is, the same service data is sent to all User Equipments (UE) in the combination area at the same time, for the UE, signals from the eNBs are like being from the same eNB, and the combination of the signals equals to the strengthening of the signal.

The MBMS and other services are transmitted in a time division manner, that is, some sub-frames are reserved from all cells inside the combination area to transmit the MBMS, the reserved sub-frames of each cell to transmit the MBMS are the same. The sub-frames are called MBSFN sub-frames and other sub-frames are arranged by each cell to transmit other services, and are called common sub-frames. In the prior art, the data packets of each service are divided into several synchronization sequences. A gateway transmits the data packet to each eNB in the combination area according to the synchronization sequences and transmits, after each synchronization sequence, a synchronization control packet. The synchronization control packet includes size information of each data packet transmitted according to the synchronization sequence. The eNB performs segmentation concatenation process on the data packet in the synchronization sequence after receiving the synchronization control packet. If a packet is lost, the eNB empties a transmission position occupied by the lost packet according to information in the synchronization control packet, and finally generates a data block transmitted on an air interface. The eNB transmits the data blocks in sequence in each pre-distributed MBSFN sub-frame. In the existing protocol, a plurality of MBMS services may be multiplexed in one Multicast Channel (MCH).

The currently proposed technical solution of transmitting the MBMS in the HeNB is to transmit data packets of all MBMS services to each HeNB in the combination area through the gateway, and transmit, after each synchronization sequence of each service, one synchronization control packet, and after receiving the synchronization control packet, each HeNB performs segmentation concatenation operation on the data packet in the synchronization sequence, and then sends, according to the service requirement of the subjacent UE thereof and in the corresponding MBSFN sub-frames, a service required by the UE to the subjacent UE. The services not required are not sent, and those MBSFN sub-frames in which no service needs to be sent may keep silent.

In the prior art, in order to ensure MBSFN transmission, the gateway transmits the data packets of all services mapped onto the same transmission channel to each HeNB in the combination area. Therefore, the load of a transmission link between the gateway and the HeNB is too large.

SUMMARY OF THE INVENTION

The present invention provides a method, device and system for transmitting an MBMS, which can lower the load of a transmission link between a gateway and an HeNB. The technical solution is as follows.

In one aspect, a method for transmitting an MBMS is provided. A first base station sends a service identifier of a multimedia broadcast multicast service MBMS that needs to be received by a user equipment in a coverage area of the first base station to a gateway. The first base station receives a data packet of the MBMS that needs to be received by the user equipment and a synchronization control packet on a first multicast channel which are sent by the gateway. The first multicast channel is a multicast channel where the MBMS that needs to be received by the user equipment is located.

In another aspect, a base station is provided. A transmitter is configured to send a service identifier of a multimedia broadcast multicast service MBMS that needs to be received by a user equipment in a coverage area of the base station to a gateway. A receiver is configured to, after the transmitter sends the service identifier to the gateway, receive a data packet of the MBMS that needs to be received by the user equipment and a synchronization control packet on a first multicast channel which are sent by the gateway. The first multicast channel is a multicast channel where the MBMS that needs to be received by the user equipment is located.

In another aspect, a method for transmitting an MBMS is provided. A service identifier is received from a base station. The service identifier is a service identifier of a multimedia broadcast multicast service MBMS that needs to be received by a user equipment in a coverage area of the base station. A data packet of the MBMS that needs to be received by the user equipment and a synchronization control packet on a first multicast channel is sent to the base station. The first multicast channel is a multicast channel where the MBMS that needs to be received by the user equipment is located.

In another aspect, a gateway is provided. A receiver is configured to receive a service identifier sent by a base station. The service identifier is a service identifier of a multimedia broadcast multicast service MBMS that needs to be received by a user equipment in a coverage area of the base station. A transmitter is configured to, after the receiver receives the service identifier, send a data packet of the MBMS that needs to be received by the user equipment and a synchronization control packet on a first multicast channel to the base station. The first multicast channel is a multicast channel where the MBMS that needs to be received by the user equipment is located.

In another aspect, a system for transmitting an MBMS is further provided, the system includes a first base station and a gateway. The first base station is configured to send a service identifier of a multimedia broadcast multicast service MBMS that needs to be received by a user equipment in a coverage area of the first base station to the gateway and to receive a data packet of the MBMS that needs to be received by the user equipment and a synchronization control packet on a first multicast channel which are sent by the gateway. The first multicast channel is a multicast channel where the MBMS that needs to be received by the user equipment is located. The gateway is configured to receive the service identifier of the MBMS that needs to be received by the user equipment in the coverage area of the first base station which is sent by the first base station and to send the data packet of the MBMS that needs to be received by the user equipment and the synchronization control packet on the first multicast channel to the first base station.

In the foregoing technical solutions, when participating in the MBSFN transmission, the first base station sends the service identifier of the MBMS that needs to be received by the UE in the coverage area thereof to the gateway, so that the gateway sends, according to the service identifier, the data packet of the MBMS that needs to be received by the UE to the first base station, and sends the synchronization control packet on the first multicast channel. For other MBMS services not required by the first base station, because data packets are not delivered, but only synchronization control packets are delivered, thereby reducing data amount sent by the gateway to the first base station, and lowering the load of a transmission link between the gateway and the first base station.

BRIEF DESCRIPTION OF THE DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention more comprehensible, the following further describes the embodiments of the present invention with reference to the accompanying drawings.

Figure 1:
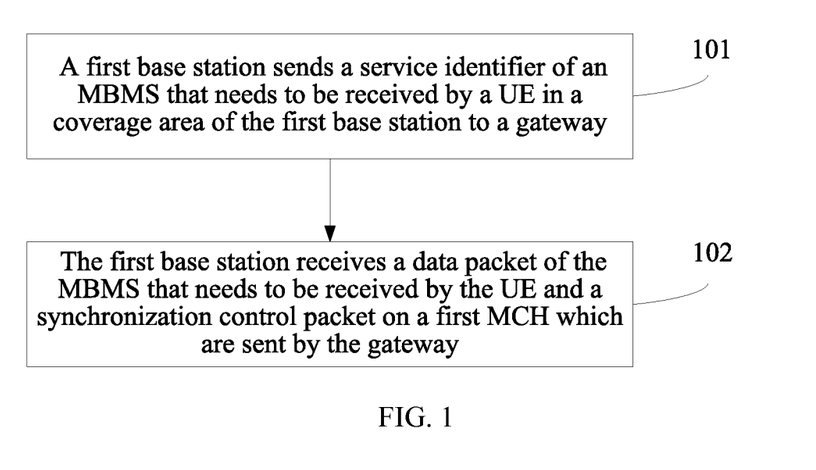
FIG. 1 is a flow chart of a method for transmitting an MBMS according to an embodiment of the present invention.

An embodiment of the present invention provides a method for transmitting an MBMS. Referring to FIG. 1, the method may include the following steps.

101: A first base station sends a service identifier of an MBMS that needs to be received by a UE in a coverage area of the first base station to a gateway.

102: The first base station receives a data packet of the MBMS that needs to be received by the UE and a synchronization control packet on a first MCH which are sent by the gateway.

The first MCH is an MCH where the MBMS that needs to be received by the UE is located, which may be one or more.

In the method according to the embodiment of the present invention, when participating in MBSFN transmission, the first base station sends the service identifier of the MBMS that needs to be received by the UE in the coverage area of the first base station to the gateway, so that the gateway sends, according to the service identifier, the data packet of the MBMS that needs to be received by the UE to the first base station, and sends the synchronization control packet on the first multicast channel. For other MBMS services not required by the first base station, because data packets are not delivered, but only synchronization control packets are delivered, thereby reducing data amount sent by the gateway to the first base station, and lowering the load of a transmission link between the gateway and the first base station.

Figure 2:
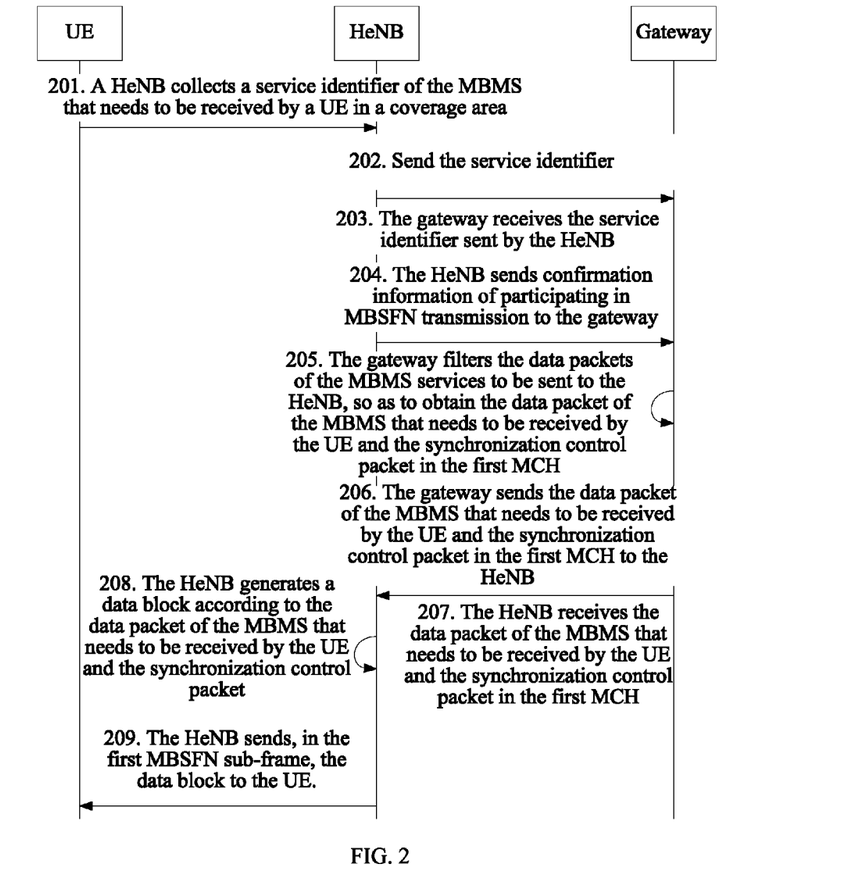
FIG. 2 is a flow chart of another method for transmitting an MBMS according to an embodiment of the present invention.

Another embodiment of the present invention also provides a method for transmitting an MBMS, where a first base station may be a base station of which a coverage area is smaller than a first threshold and/or of which the number of users is smaller than a second threshold, preferably, the first threshold and the second threshold adopts smaller values, that is, a base station with a smaller coverage area and/or a smaller number of the users, such as an HeNB; a second base station may be a macro base station such as an eNB and NB. For the convenience of illustration, the embodiment of the present invention takes an HeNB and eNB as an example, but is not limited to this. Referring to FIG. 2, the method may include the following steps:

201: An HeNB collects a service identifier of an MBMS that needs to be received by a UE in a coverage area of the HeNB.

Specifically, the HeNB gathers the service identifiers of the MBMS services to be received by all the UEs in the coverage area of the HeNB together, which may form a list of the service identifiers.

202: The HeNB sends the service identifier of the MBMS that needs to be received by the UE in the coverage area of the HeNB to a gateway.

The HeNB can be connected to a radio network in two manners, and therefore, the gateway mentioned in the embodiment of the present invention not only may be a Serving Gateway (S-GW), but also may be an HeNB-GW.

For example, the manner in which the HeNB is connected to the network is that the HeNB is directly connected to a Mobility Management Entity (MME) and an S-GW of a core network, the MME is responsible for signaling process of a control plane, the S-GW is responsible for data forwarding of a user plane, and the connecting manner is the same as the manner in which the eNB is connected to the network. If this manner is adopted, the HeNB can not only send the list of the service identifiers to the S-GW, but also send the list of the service identifiers to the MME, and the MME notifies the S-GW of the list of the service identifiers.

Still for example, the manner in which the HeNB is connected to the network is that first several HeNBs are connected to the HeNB-GW, and then are connected to the MME and S-GW through the HeNB-GW. The connecting manner can effectively reduce the processing load of the MME. If the manner is adopted, the HeNB directly sends the list of the service identifiers to the HeNB-GW.

203: The gateway receives the service identifier sent by the HeNB.

The service identifier is a service identifier of the MBMS that needs to be received by the UE in the coverage area of the HeNB, and the gateway receives and saves a service identifier sent by each HeNB connected to the gateway.

204: The HeNB sends confirmation information of participating in MBSFN transmission to the gateway.

Specifically, the HeNB may participate in the MBSFN transmission of a certain MBSFN combination area, or may not participate in the MBSFN transmission. Therefore, the HeNB needs to send information of whether to participate in the MBSFN transmission to the gateway. If participating in the MBSFN transmission, the HeNB sends the confirmation information of participating in the MBSFN transmission to the gateway. Because the gateway does not know what MBMS services are delivered in which MCHs by each of the eNBs that are pre-configured in a MBSFN combination area, the confirmation information sent to the gateway by the HeNB also includes service identifiers of other MBMS services or service identifiers of all MBMS services. The other MBMS services are MBMS services which are mapped onto the first MCH except the MBMS that needs to be received by the UE, and the all MBMS services are all MBMS services which are mapped onto the first MCH, including the MBMS that needs to be received by the UE.

The first MCH refers to an MCH where the MBMS that needs to be received by the UE is located, and may also be considered as an MCH to which the MBMS that needs to be received by the UE is mapped.

For example, the MBMS services to be received by the UE in the coverage area of the HeNB are services A1 and B4, the service A1 is mapped onto MCH1, and services A2 and A3 are also mapped onto the MCH1, the service B4 is mapped onto MCH2, and services B1, B2, and B3 are also mapped onto the MCH2, then the service identifiers of other MBMS services are service identifiers of A2, A3, B1, B2, and B3, and the service identifiers of all MBMS services are service identifiers of A1, A2, A3, B1, B2, B3, and B4.

Further, if the MBMS that needs to be received by the UE is unchanged, but the HeNB changes a mapping between the MCH and the MBMS, at this time, the HeNB may notify the gateway of the service identifiers of other MBMS services or the service identifiers of all MBMS services after the mapping is changed, thereby enabling the gateway to update service identifiers of corresponding other MBMS services or the service identifiers of all MBMS services. As in the foregoing example, the MBMS services to be received by the UE still are services A1 and B4, and services C1 and C2 are mapped onto MCH3, but the base station changes the mapping between the MCH and the MBMS later, thereby enabling the service B4 to be mapped onto the MCH3, at this time, the service identifiers of other MBMS services should be changed to the service identifiers of A2, A3, C1 and C2, the service identifiers of all MBMS services should be changed to the service identifiers of A1, A2, A3, B4, C1 and C2, the HeNB may notify the gateway of the service identifiers of the changed other MBMS services or the service identifiers of all MBMS services in real time. That is, optionally, the confirmation information including the service identifiers of other MBMS services or the service identifiers of all MBMS services are sent out when a mapping between the first MCH and any MBMS on the MCH changes. The execution of step 204 may also be before step 201.

205: After receiving the confirmation information of participating in the MBSFN transmission, the gateway screens the data packets of the MBMS services to be sent to the HeNB, so as to obtain a data packet of the MBMS that needs to be received by the UE and a synchronization control packet on the first MCH.

For example, the synchronization control packet on the first MCH refers to the synchronization control packets of all MBMS services mapped onto the first MCH.

Specifically, the gateway screens the data packet and the synchronization control packet of the MBMS according to the service identifier sent by the HeNB and the service identifier carried in the data packet and the synchronization control packet of the MBMS. The screening manner is as follows. The gateway receives the confirmation information of participating in the MBSFN transmission sent by the HeNB, if the confirmation information includes the service identifiers of other MBMS services, the gateway screens out the data packet and the synchronization control packet of the MBMS that needs to be received by the UE according to the service identifier of the MBMS that needs to be received by the UE, and screens out the synchronization control packets of other MBMS services according to the service identifiers of other MBMS services; if the confirmation information includes the service identifiers of all MBMS services, the gateway screens out the data packet of the MBMS that needs to be received by the UE according to the service identifier of the MBMS that needs to be received by the UE, and screens out the synchronization control packets of all MBMS services according to the service identifiers of all MBMS services.

The data packet may be one or more, and the synchronization control packet may also be one or more.

206: The gateway sends the data packet of the MBMS that needs to be received by the UE and the synchronization control packet on the first MCH to the HeNB.

The first MCH refers to an MCH where the MBMS that needs to be received by the UE is located, if the MBMS that needs to be received by the UE is mapped onto multiple MCHs, the first MCH includes the multiple MCHs.

Specifically, the gateway sends, according to a synchronization sequence of each MBMS, the MBMS to the HeNB which participates in the MBSFN transmission. For the MBMS that needs to be received by the UE of the HeNB, the data packet and the synchronization control packet are delivered, for other services mapped onto the first MCH and not required by the HeNB, the data packet is not delivered and the synchronization control packet is delivered to the HeNB only after each synchronization sequence of each service, where the synchronization control packet is the same as the synchronization control packet sent to the eNB in the MBSFN combination area, that is, the synchronization control packet includes size (Size) information of each data packet transmitted, in the synchronization sequence, to the eNB in the combination area.

Figure 3:
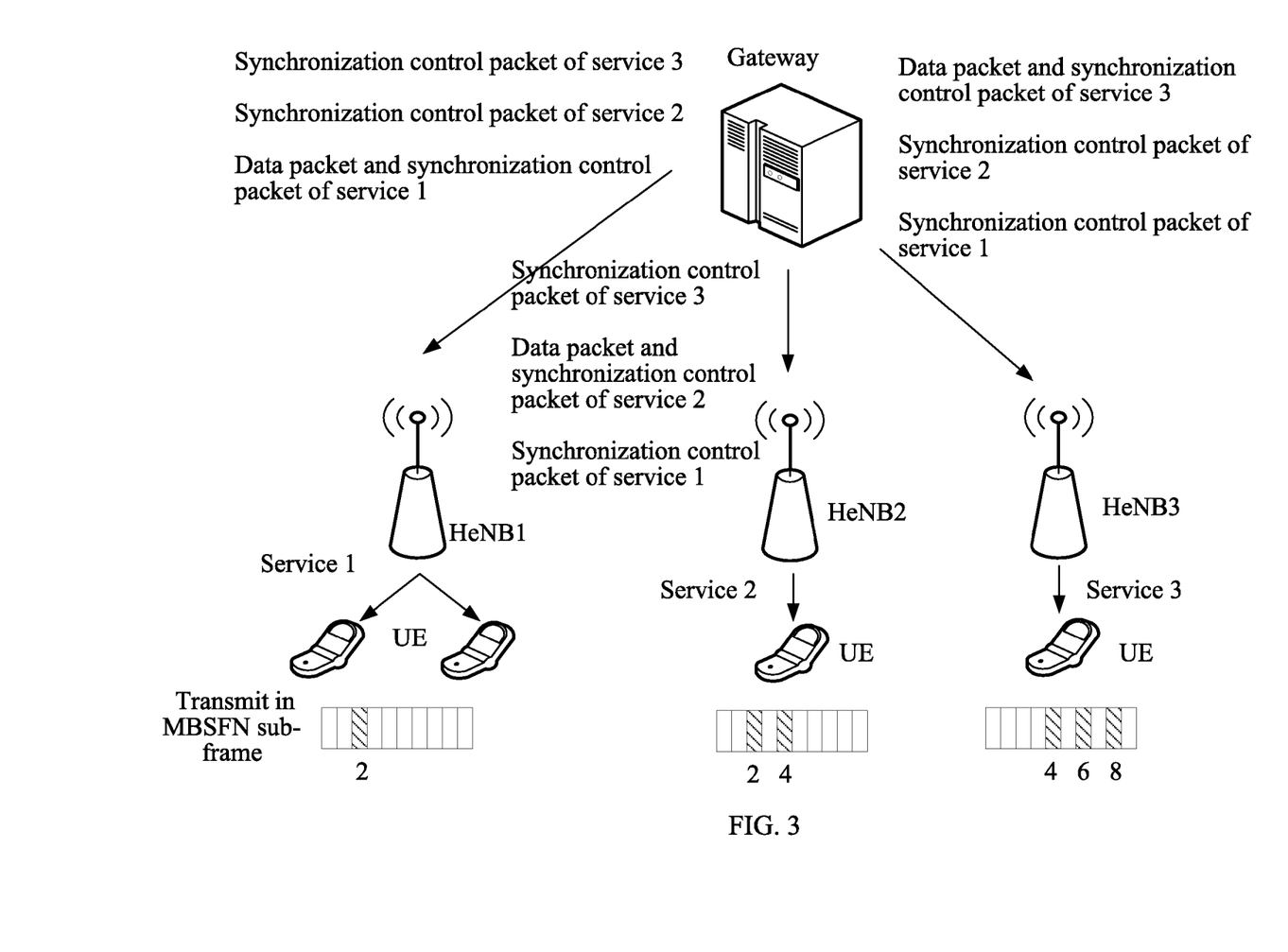
FIG. 3 is a schematic diagram of an application scenario for transmitting an MBMS according to an embodiment of the present invention.

For example, referring to FIG. 3, it is a schematic diagram of an application scenario for transmitting the MBMS. Service 1, service 2 and service 3 are the MBMS services which are mapped onto the same MCH in the MBSFN combination area, but the three HeNBs participating in the MBSFN transmission in the combination area only need one service respectively. Adopting the method according to the embodiments of the present invention, the gateway sends, according to the service identifier reported by the three HeNBs, a data packet of the service 1 and synchronization control packets of the service 1, the service 2 and the service 3 to HeNB1, sends a data packet of the service 2 and the synchronization control packets of the service 1, the service 2 and the service 3 to HeNB2 and sends a data packet of the service 3 and the synchronization control packets of the service 1, the service 2 and the service 3 to HeNB3.

207: The HeNB receives the data packet of the MBMS that needs to be received by the UE and the synchronization control packet on the first MCH which are sent by the gateway.

208: The HeNB generates a data block according to the data packet of the MBMS that needs to be received by the UE and the synchronization control packet.

Specifically, the HeNB performs segmentation concatenation process on the received data packet of the MBMS. If there is an unreceived data packet of an MBMS in a same synchronization sequence, the HeNB obtains the synchronization control packet of the synchronization sequence, where the synchronization control packet includes the size information of a data packet of each MBMS in the synchronization sequence, empties, according to the size information of the data packet of each MBMS, a transmission position occupied by the unreceived data packet of the MBMS, and generates a data block which is the same as a data block generated by the eNB, and the eNB and the HeNB are in a same MBSFN combination area.

Figure 4:
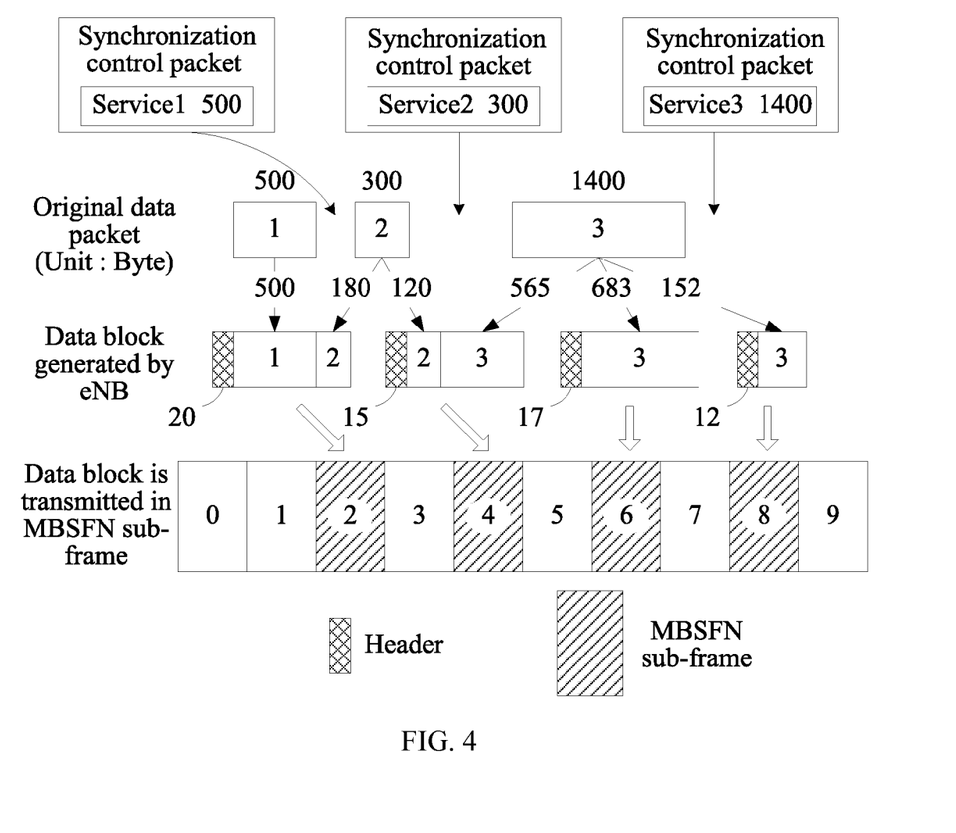
FIG. 4 is a schematic diagram of data processing of an eNB in MBSFN transmission according to an embodiment of the present invention.

Data process of the eNB in the MBSFN transmission is shown in FIG. 4. After receiving the three data packets and the synchronization control packets of the service 1, the service 2, and the service 3, the eNB in the MBSFN combination area performs segmentation concatenation process on the three data packets and finally generates the data block transmitted in an air interface. In the prior art, some headers need to be added in the processing procedure, the lengths of the headers are related to the size of the data packet. For the data packets of different sizes, the lengths of the headers added when the data block is generated may be different, further causing that the size of the effective data which can be transmitted except the header in the data block is different. For example, as shown in FIG. 4, assume that sub-frames 2, 4, 6 and 8 are configured as MBSFN sub-frames, other sub-frames are common sub-frames, each MBSFN sub-frame can transmit 700 bytes, and after receiving the data packets with sizes of 500 bytes, 300 bytes and 1400 bytes, the eNB performs segmentation concatenation process and generates four data blocks: the overhead of a header of a first data block is 20 bytes, the data block includes all data of the service 1 and the data of the first 180 bytes of the service 2, and is sent in sub-frame 2; the overhead of a header of a second data block is 15 bytes, the data block includes data of the last 120 bytes of the service 2 and data of the first 565 bytes of the service 3, and is sent in sub-frame 4; the overhead of a header of a third data block is 17 bytes, the data block includes data of the intermediate 683 bytes of the service 3, and is sent in sub-frame 6; the overhead of a header of a fourth data block is 12 bytes, the data block includes data of the last 152 bytes of the service 3, and is sent in sub-frame 8.

Because the HeNB needs to stay consistent with the MBSFN transmitting manner of the eNB, the data block which is the same as the eNB needs to be generated. The following will be illustrated with an example of HeNB2 in FIG. 3. The data process of the HeNB2 in the MBSFN transmission may be shown in FIG. 5. After receiving a data packet of the service 2 to be received by the UE and the synchronization control packets of the service 1, service 2 and service 3, the HeNB2 performs segmentation concatenation process. Because the HeNB2 does not receive data packets of the service 1 and service 3 not required by the UE, the eNB may know, according to the information in the synchronization control packet of the service 1, that the size of the data packet of the service 1 is 500 bytes; deduce, according to the size of the data packet of the service 1 and the size of the data packet of the service 2, that the overhead of the header of the first data block is 20 bytes, and empty a transmission position occupied by the 500 bytes of the service 1, and then put in the data of the first 180 bytes of the data packet of the received service 2 to form a complete data block; then the eNB knows, according to the information in the synchronization control packet of the service 3, that the size of the data packet of the service 3 is 1400 bytes, deduces, according to the size of the data packet of the service 3 and the size of the data packet of the received service 2, that the overhead of the header of the second data block is 15 bytes, and then put in the data of the last 120 bytes of the data packet of the service 2 and empty the transmission position occupied by the first 565 bytes of the service 3 to form a second complete data block. In this way, it can be ensured that the generated data block is the same as the one generated by the eNB.

209: The HeNB sends, in the first MBSFN sub-frame, the data block of the MBMS that needs to be received by the UE to the UE.

The first MBSFN sub-frame is an MBSFN sub-frame corresponding to the data block of the MBMS that needs to be received by the UE.

Figure 5:
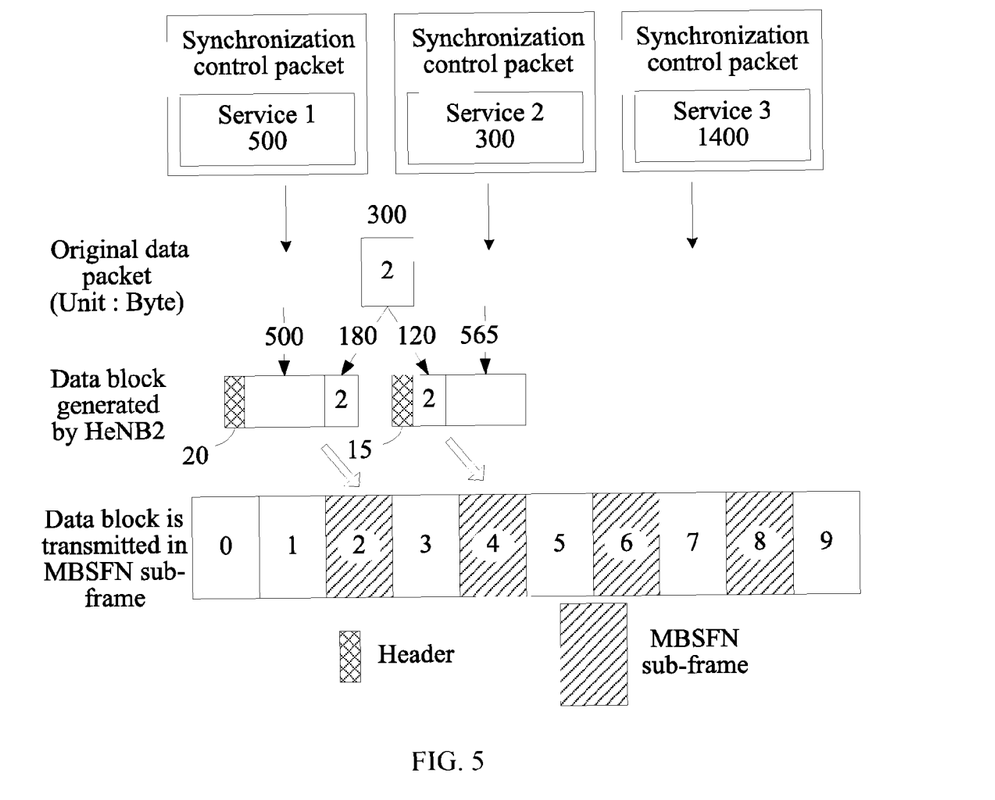
FIG. 5 is a schematic diagram of data processing of an HeNB2 in MBSFN transmission according to an embodiment of the present invention.

Specifically, according to the service requirement of the subjacent UE thereof, the HeNB sends, in the first MBSFN sub-frame, the corresponding service data block to the UE from the air interface. Those MBSFN sub-frames with no sending service can keep silent, so as not to cause interference to other base stations, or can also use low power to send other data to improve the utilization. For example, as shown in FIG. 5, the HeNB2 sends, in the sub-frame 2, the first data block to the subjacent UE, and sends, in the sub-frame 4, the second data block to the subjacent UE, and keeps silent in the sub-frame 6 and sub-frame 8.

In the embodiment of the present invention, after getting the service identifier of the MBMS that needs to be received by the UE and uploaded by the HeNB, if the gateway knows that the HeNB does not participate in the MBSFN transmission, the gateway only needs to send the service data according to the common requirement of the HeNB.

In the method according to the embodiment of the present invention, when participating in the MBSFN transmission, the HeNB sends the service identifier of the MBMS that needs to be received by the UE in the coverage area thereof to the gateway, so that the gateway screens, according to the service identifier, the data packets of all MBMS services to be sent to the HeNB, sends the data packet of the MBMS that needs to be received by the UE to the HeNB, and sends the synchronization control packet on the first MCH. For other MBMS services not required by the HeNB, because data packets are not delivered, but only synchronization control packet are delivered, thereby reducing data amount transmitted by the gateway to the HeNB, and lowering the load of a transmission link between the gateway and the HeNB; besides, the HeNB generates the data block according to the received data packet and synchronization control packet, empties the transmission position occupied by the unreceived data packet of the MBMS, and can generate the data block which is the same as the eNB in the MBSFN sub-frames corresponding to the data block of the MBMS to received by the UE, thereby ensuring that the HeNB can perform the MBSFN transmission.

Figure 6:
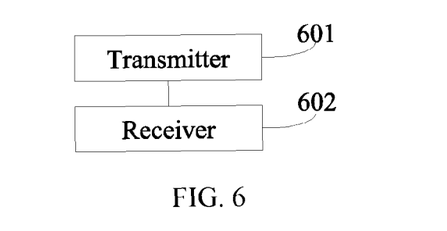
FIG. 6 is a schematic structural diagram of a base station according to an embodiment of the present invention.

Another embodiment of the present invention provides a base station, the base station may be a base station of which a coverage area is smaller than a first threshold and/or the number of users is smaller than a second threshold, preferably, the first threshold and the second threshold adopt smaller values, that is, the base station with a smaller coverage area and/or a smaller number of the users, such as HeNB. The base station can implement the steps of the method of the first base station or HeNB side in the foregoing embodiment. Referring to FIG. 6, the base station includes:

a transmitter 601, configured to send a service identifier of an MBMS that needs to be received by a UE in a coverage area of the base station to a gateway; and a receiver 602, configured to: after the transmitter 601 sends the service identifier to the gateway, receive a data packet of the MBMS that needs to be received by the UE and a synchronization control packet on a first MCH which are sent by the gateway, where the first MCH is an MCH where the MBMS that needs to be received by the UE is located.

Figure 7:
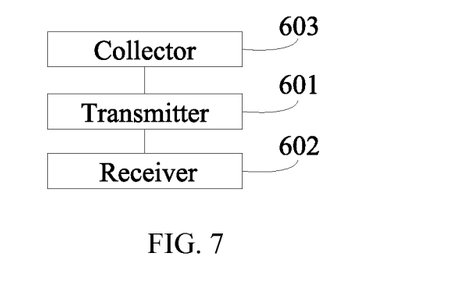
FIG. 7 is a schematic structural diagram of another base station according to an embodiment of the present invention.

Further, referring to FIG. 7, the base station further includes:

a collector 603, configured to collect the service identifier of the MBMS that needs to be received by the UE in the coverage area of the base station, and provide the service identifier for the transmitter 601.

Further, the transmitter 601 is also configured to: before the receiver 602 receives the data packet of the MBMS that needs to be received by the UE and the synchronization control packet on the first MCH which are sent by the gateway, send confirmation information of participating in MBSFN transmission to the gateway, where the confirmation information includes the service identifiers of other MBMS services, and the other MBMS services are the MBMS services which are mapped onto the first MCH except the MBMS that needs to be received by the UE; or the confirmation information includes service identifiers of all MBMS services, the all MBMS services are all MBMS services which are mapped onto the first MCH including the MBMS that needs to be received by the UE.

Figure 8:
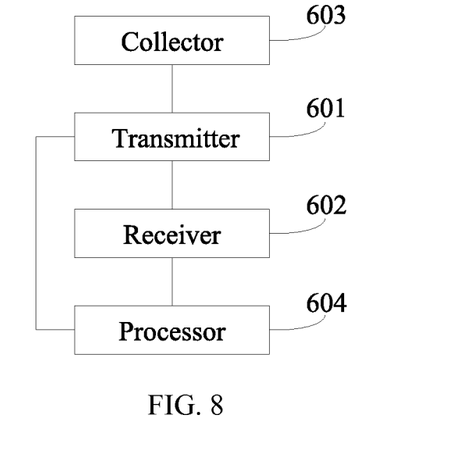
FIG. 8 is a schematic structural diagram of another base station according to an embodiment of the present invention.

Further, referring to FIG. 8, the base station further includes:

a processor 604, configured to generate a data block according to the data packet of the MBMS that needs to be received by the UE and the synchronization control packet; and a transmitter 601, configured to send, in a first MBSFN sub-frame, the data block of the MBMS that needs to be received by the UE to the UE, where the first MBSFN sub-frame is an MBSFN sub-frame corresponding to the data block of the MBMS that needs to be received by the UE.

Further, the processor 604 is specifically configured to perform segmentation concatenation process on the received data packet of the MBMS. If there is an unreceived data packet of an MBMS in a same synchronization sequence, the processor obtains a synchronization control packet of the synchronization sequence, where the synchronization control packet includes size information of a data packet of each MBMS in the synchronization sequence, empties, according to the size information of the data packet of each MBMS, the transmission position occupied by the unreceived data packet of the MBMS, and generates a data block which is the same as a data block generated by a second base station, and the second base station and the base station are in a same MBSFN combination area. The second base station may be a macro base station such as eNB and NB.

When participating in the MBSFN transmission, the base station according to the embodiment of the present invention sends the service identifier of the MBMS that needs to be received by the UE in the coverage area thereof to the gateway, so that the gateway screens, according to the service identifier, the data packets of all MBMS services to be sent to the base station, sends the data packet of the MBMS that needs to be received by the UE to the base station, and sends the synchronization control packet on the first MCH. For other MBMS services not required by the base station, because data packets are not delivered, but only synchronization control packets are delivered, thereby reducing data amount transmitted by the gateway to the base station, and lowering the load of a transmission link between the gateway and the base station; besides, the base station generates the data block according to the received data packet and synchronization control packet, empties the transmission position occupied by the unreceived data packet of the MBMS, and can generate the data block which is the same as the second base station in the MBSFN sub-frames corresponding to the data block of the MBMS to received by the UE, thereby ensuring that the HeNB can perform the MBSFN transmission.

Figure 9:
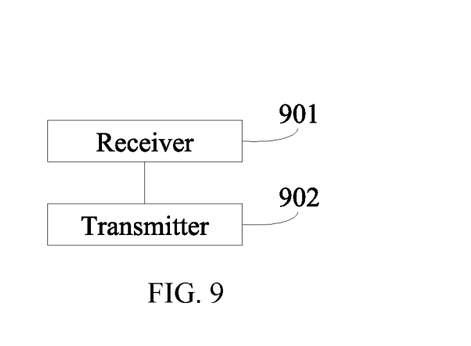
FIG. 9 is a schematic structural diagram of a gateway according to an embodiment of the present invention.

Another embodiment of the present invention provides a gateway, which can implement the step of the method of the gateway side in the foregoing embodiment. Referring to FIG. 9, the gateway includes:

a receiver 901, configured to receive a service identifier sent by a base station, where the service identifier is a service identifier of an MBMS that needs to be received by a UE in a coverage area of the base station; and a transmitter 902, configured to: after the receiver 901 receives the service identifier of the MBMS that needs to be received by the UE, send a data packet of the MBMS that needs to be received by the UE and a synchronization control packet on a first MCH, where the first MCH is an MCH where the MBMS that needs to be received by the UE is located.

Further, the receiver 901 is also configured to: before the transmitter 902 sends the data packet of the MBMS that needs to be received by the UE and the synchronization control packet on the first MCH to the base station, receive confirmation information of participating in MBSFN transmission sent by the base station.

Figure 10:
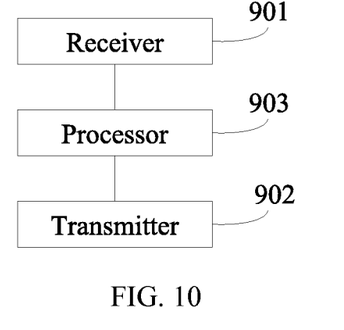
FIG. 10 is a schematic structural diagram of another gateway according to an embodiment of the present invention.

Correspondingly, referring to FIG. 10, the gateway also includes a processor 903, where the processor 903 is configured to: when the confirmation information includes service identifiers of other MBMS services, screen out the data packet and the synchronization control packet of the MBMS that needs to be received by the UE according to the service identifier of the MBMS that needs to be received by the UE, and screen out the synchronization control packets of other MBMS services according to the service identifiers of other MBMS services, where the other MBMS services are the MBMS services which are mapped onto the first MCH except the MBMS that needs to be received by the UE; or the processor 903 is configured to: when the confirmation information includes service identifiers of all MBMS services, screen out the data packet of the MBMS that needs to be received by the UE according to the service identifier of the MBMS that needs to be received by the UE, and screen out the synchronization control packets of all MBMS services according to the service identifiers of the all MBMS services, where the all MBMS services are the MBMS services which are mapped onto the first MCH including the MBMS that needs to be received by the UE.

The gateway according to the embodiment of the present invention receives the service identifier of the MBMS that needs to be received by the UE in the coverage area of the base station sent by the base station, filers, according to the service identifier, the data packets of all MBMS services to be sent to the base station, sends the data packets of the MBMS that needs to be received by the UE to the base station, and sends the synchronization control packet on the first MCH. For the other MBMS services not required by the base station, because data packets are not delivered, but only synchronization control packets are delivered, thereby reducing data amount transmitted to the base station by the gateway, and lowering the load of a transmission link between the gateway and the base station.

Figure 11:
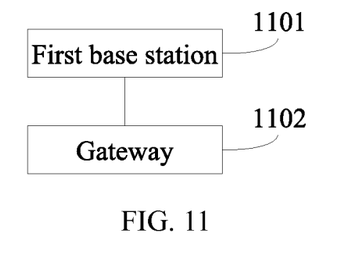
FIG. 11 is a schematic diagram of a system for transmitting an MBMS according to an embodiment of the present invention.

Another embodiment of the present invention provides a system for transmitting an MBMS. Referring to FIG. 11, the system includes: a first base station 1101 and a gateway 1102.

The first base station 1101 is configured to send a service identifier of an MBMS that needs to be received by a UE in a coverage area of the first base station 1101 to the gateway 1102; receive a data packet of the MBMS that needs to be received by the UE and a synchronization control packet on a first MCH sent by the gateway 1102, where the first MCH is an MCH where the MBMS that needs to be received by the UE is located.

The gateway 1102 is configured to receive the service identifier of the MBMS that needs to be received by the UE in the coverage area of the first base station 1101 sent by the first base station 1101; send the data packet of the MBMS that needs to be received by the UE and the synchronization control packet on the first MCH to the first base station 1101.

Further, before sending the service identifier of the MBMS that needs to be received by the UE in the coverage area of the first base station 1101 to the gateway 1102, the first base station 1101 is also configured to collect the service identifier of the MBMS that needs to be received by the UE in the coverage area of the first base station 1101.

Further, before receiving the data packet of the MBMS that needs to be received by the UE and the synchronization control packet on the first MCH sent by the gateway 1102, the first base station 1101 is further configured to send the confirmation information of participating in MBSFN transmission to the gateway 1102.

Correspondingly, the gateway 1102 is configured to receive the confirmation information of participating in the MBSFN transmission sent by the first base station 1101, when the confirmation information includes the service identifiers of other MBMS services, screen out the data packet of the MBMS that needs to be received by the UE and the synchronization control packet according to the service identifier of the MBMS that needs to be received by the UE, and screen out the synchronization control packets of other MBMS services according to the service identifiers of other MBMS services, where the other MBMS services are MBMS services which are mapped onto the first MCH except the MBMS that needs to be received by the UE; or when the confirmation information includes the service identifiers of all MBMS services, screen out the data packet of the MBMS that needs to be received by the UE according to the service identifier of the MBMS that needs to be received by the UE, and screen out the synchronization control packets of all MBMS services according to the service identifiers of all MBMS services, where the all MBMS services are MBMS services which are mapped onto the first MCH including the MBMS that needs to be received by the UE.

Further, after receiving the data packet of the MBMS that needs to be received by the UE and the synchronization control packet on the first MCH sent by the gateway 1102, the first base station 1101 is further configured to: according to the data packet of the MBMS that needs to be received by the UE and the synchronization control packet, generate a data block; send, in a first MBSFN sub-frame, the data block of the MBMS that needs to be received by the UE to the UE, where the first MBSFN sub-frame is an MBSFN sub-frame corresponding to the data block of the MBMS that needs to be received by the UE.

Further, when generating the data block according to the data packet of the MBMS that needs to be received by the UE and the synchronization control packet, the first base station 1101 is specifically configured to perform segmentation concatenation process on the received data packet of the MBMS. If there is an unreceived data packet of an MBMS in a same synchronization sequence, the first base station 1101 obtains a synchronization control packet of the synchronization sequence, where the synchronization control packet includes the size information of a data packet of each MBMS in the synchronization sequence, empties the transmission position occupied by the unreceived data packet of the MBMS according to the size information of the data packet of each MBMS, generates a data block which is the same as a data block generated by a second base station, and the second base station and the first base station 1101 are in a same MBSFN combination area.

In conclusion, in the embodiment of the present invention, the first base station sends the service identifier of the MBMS that needs to be received by the UE in the coverage area thereof to the gateway, so that the gateway screens, according to the service identifier, the data packets of all MBMS services to be sent to the first base station, sends the data packet of the MBMS that needs to be received by the UE to the first base station, and sends the synchronization control packet on the first MCH. For other MBMS services not required by the first base station, because data packets are not delivered, but only synchronization control packets are delivered, thereby reducing data amount transmitted by the gateway to the first base station, and lowering the load of a transmission link between the gateway and the first base station; besides, the first base station generates the data block according to the received data packet and synchronization control packet, empties the transmission position occupied by the unreceived data packet of the MBMS, and can generate the data block which is the same as the second base station in the MBSFN sub-frames corresponding to the data block of the MBMS to received by the UE, thereby ensuring that the first base station can perform the MBSFN transmission.

It should be noted that: when the base station and the gateway according to the foregoing embodiments are transmitting the MBMS, it is illustrated with an example of division of each function module. In the practical application, the function distribution may be finished by different function modules according to the requirements, that is, divide the internal structure of the equipment into different function modules, so as to finish all or part of the functions described above. Besides, the base station and the gateway according to the foregoing embodiment and the method embodiment of transmitting the MBMS belong to one concept. For the specific implementing procedure, see the method embodiment, which will not be described herein again.

The sequence numbers of the preceding embodiments of the present invention are merely for description purpose but do not indicate the preference of the embodiments.

A person of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk.

The foregoing descriptions are merely preferred embodiments of the present invention and are not intended to limit the present invention. Any modification, equivalent replacement, or improvement made within the spirit and principle of the present invention shall fall within the protection scope of the present invention.

What is claimed is:

1. A method for transmitting a Multimedia Broadcast Multicast Service (MBMS), wherein the method comprises:
sending, by a first base station, a service identifier of a first MBMS that is to be received by a user equipment in a coverage area of the first base station, the service identifier being sent to a gateway; and
receiving, by the first base station, a data packet of the MBMS that is to be received by the user equipment and a synchronization control packet on a first multicast channel, the data packet and the synchronization control packet being sent by the gateway, wherein the first multicast channel is a multicast channel where the MBMS that needs to be received by the user equipment is located;
performing a segmentation concatenation process that generates one or more data blocks carrying data from the data packet of the MBMS that needs to be received by the user equipment according to the synchronization control packet and further carrying an empty transmission position corresponding to at least one other MBMS according to the synchronization control packet and that is to be received by a user equipment outside of a coverage area of the first base station; and
transmitting MBMS data to the user equipment by the first base station, the transmitting the MBMS data including transmitting the one or more data blocks in first subframes associated with the MBMS that needs to be received by the user equipment, and further including keeping silent in subframes other than the first subframes associated with the MBMS that needs to be received by the user equipment, wherein the at least one other MBMS is an MBMS service, other than the MBMS that needs to be received by the user equipment, which is mapped onto the first multicast channel.

2. The method according to claim 1, wherein, before sending the service identifier, the method further comprises collecting the service identifier of the MBMS that needs to be received by the user equipment in the coverage area of the first base station.

3. The method according to claim 1, wherein, before receiving the data packet and the synchronization control packet, the method further comprises sending, by the first base station, confirmation information of participating in Multimedia Broadcast Multicast Service single frequency Network (MBSFN) transmission to the gateway, wherein the confirmation information comprises service identifiers of the at least one other MBMS.

4. The method according to claim 1, wherein, before receiving the data packet and the synchronization control packet, the method further comprises sending, by the first base station, confirmation information of participating in Multimedia Broadcast Multicast Service single frequency Network (MBSFN) transmission to the gateway, wherein the confirmation information comprises service identifiers of all MBMS services, the all MBMS services are all MBMS services which are mapped onto the first multicast channel, comprising the MBMS that needs to be received by the user equipment.

5. The method according to claim 1, wherein, the transmitting the MBMS data to the user equipment by the first base station comprises:
sending, in one or more first Multimedia Broadcast Multicast Service single frequency Network (MBSFN) subframes, the one or more data blocks to the user equipment, wherein the one or more first MBSFN sub-frames correspond to one or more the data blocks.

6. The method according to claim 5,
wherein the empty transmission position corresponds to at least one other MBMS for which a data packet is unrecieved and that is in a same synchronization sequence as the the MBMS that needs to be received by the user equipment, and wherein the synchronization control packet is a synchronization control packet of the synchronization sequence, wherein the synchronization control packet comprises size information of a data packet of each MBMS in the synchronization sequence; and
wherein the one or more data blocks are the same as one or more data blocks generated by a second base station, wherein the second base station and the first base station are in a same MBSFN combination area.

7. A base station, comprising:
a transmitter, configured to send a service identifier of a Multimedia Broadcast Multicast Service (MBMS) that needs to be received by a user equipment in a coverage area of the base station to a gateway;
a receiver, configured to, after the transmitter sends the service identifier to the gateway, receive a data packet of the MBMS that needs to be received by the user equipment and a synchronization control packet on a first multicast channel that are sent by the gateway, wherein the first multicast channel is a multicast channel where the MBMS that needs to be received by the user equipment is located;
a processor connected to the transmitter and to the receiver; and
a non-transitory computer readable medium connected to the processor and having stored thereon instructions that, when executed by the processor, cause the base station to perform a segmentation concatenation process that generates one or more data blocks carrying data from the data packet of the MBMS that needs to be received by the user equipment according to the synchronization control packet and further carrying an empty transmission position corresponding to at least one other MBMS according to the synchronization control packet and that is to be received by a user equipment outside of a coverage area of the base station; and
wherein the receiver is further configured to transmit MBMS data to the user equipment by the first base station, the transmitting the MBMS data including transmitting the one or more data blocks in first subframes associated with the MBMS that needs to be received by the user equipment, and further including keeping silent in subframes other than the first subframes associated with the MBMS that needs to be received by the user equipment, wherein the at least one other MBMS is an MBMS service, other than the MBMS that needs to be received by the user equipment, which is mapped onto the first multicast channel.

8. The base station according to claim 7, wherein the base station further comprises a collector, configured to collect the service identifier of the MBMS that needs to be received by the user equipment in the coverage area of the base station and to provide the service identifier for the transmitter.

9. The base station according to claim 7, wherein the transmitter is further configured to, before the receiver receives the data packet of the MBMS that needs to be received by the user equipment and the synchronization control packet on the first multicast channel which are sent by the gateway, send confirmation information of participating in Multimedia Broadcast Multicast Service single frequency Network (MBSFN) transmission to the gateway, wherein the confirmation information comprises service identifiers of other MBMS services, the other MBMS services are MBMS services which are mapped onto the first multicast channel except the MBMS that needs to be received by the user equipment.

10. The base station according to claim 7, wherein the transmitter is further configured to, before the receiver receives the data packet of the MBMS that needs to be received by the user equipment and the synchronization control packet on the first multicast channel which are sent by the gateway, send confirmation information of participating in Multimedia Broadcast Multicast Service single frequency Network (MBSFN) transmission to the gateway, wherein the confirmation information comprises service identifiers of all MBMS services, the all MBMS services are all MBMS services which are mapped onto the first multicast channel and comprise the MBMS that needs to be received by the user equipment.

11. The base station according to claim 7,
wherein the transmitter is further configured to send, in first MBSFN sub-frame, the one or more data blocks to the user equipment, wherein the first MBSFN sub-frame is an MBSFN sub-frame corresponding to the data block.

12. The base station according to claim 11, wherein the processor is specifically configured to:
wherein the empty transmission position corresponds to at least one other MBMS for which a data packet is unreceived and that is in a same synchronization sequence as the MBMS that needs to be received by the user equipment, obtain a synchronization control packet of the synchronization sequence, wherein the synchronization control packet comprises size information of a data packet of each MBMS in the synchronization sequence; and
wherein the one or more data blocks are the same as one or more data blocks generated by a second base station, wherein the second base station and the base station are in a same MBSFN combination area.

13. A method for transmitting a Multimedia Broadcast Multicast Service (MBMS), wherein the method comprises:
receiving a service identifier sent by a base station, wherein the service identifier is a service identifier of a MBMS that needs to be received by a user equipment in a coverage area of the base station; and
sending, to the base station, a data packet of the MBMS that needs to be received by the user equipment without sending, to the base station, data packets of other MBMS services that are mapped onto a first multicast channel with the MBMS that needs to be received by the user equipment, and further sending a synchronization control packet on the first multicast channel, wherein the first multicast channel is a multicast channel where the MBMS that needs to be received by the user equipment is located.

14. The method according to claim 13, wherein, before sending the data packet of the MBMS and the synchronization control packet, the method further comprises receiving confirmation information of participating in multimedia broadcast multicast service single frequency network MBSFN transmission sent by the base station.

15. The method according to claim 14, wherein the confirmation information comprises service identifiers of the other MBMS services, the method further comprising screening out the data packet of the MBMS that needs to be received by the user equipment and the synchronization control packet according to the service identifier of the MBMS that needs to be received by the user equipment, and screening out the synchronization control packets of other MBMS services according to the service identifiers of other MBMS services.

16. The method according to claim 14, wherein confirmation information comprises service identifiers of all MBMS services, the all MBMS services are all MBMS services which are mapped onto the first multicast channel and comprise the MBMS that needs to be received by the user equipment, the method further comprising screening out the data packet of the MBMS that needs to be received by the user equipment according to the service identifiers of the MBMS that needs to be received by the user equipment, and screening out the synchronization control packets of all MBMS services according to the service identifiers of all MBMS services.

* * * * *